United States Patent
Blue

[19]

[11] Patent Number: 5,866,201
[45] Date of Patent: Feb. 2, 1999

[54] SOLID/LIQUID ROTATIONAL MIXING SYSTEM

[76] Inventor: David Blue, 3575 Gordon Rd., Elkhart, Ind. 46516

[21] Appl. No.: 650,871

[22] Filed: May 20, 1996

[51] Int. Cl.⁶ .................................................. B05D 7/00
[52] U.S. Cl. .................... 427/212; 222/235; 222/240; 222/241; 366/246; 366/296; 427/420; 427/430.1
[58] Field of Search ..................................... 366/246, 296; 222/235, 240, 241; 427/444, 212, 420, 430.1

[56] References Cited

U.S. PATENT DOCUMENTS

| | | | |
|---|---|---|---|
| 3,421,740 | 1/1969 | Behrens | 259/41 |
| 3,734,471 | 5/1973 | Engels | 259/6 |
| 3,856,278 | 12/1974 | Eisenmann | 259/192 |
| 3,968,771 | 7/1976 | Walgenbach et al. | 118/303 |
| 4,025,058 | 5/1977 | Mizuguchi | 259/192 |
| 4,079,696 | 3/1978 | Weber | 118/417 |
| 4,107,787 | 8/1978 | Ocker | 366/75 |
| 4,202,636 | 5/1980 | Venderveen | 366/319 |
| 4,387,997 | 6/1983 | Klein et al. | 366/79 |
| 4,516,524 | 5/1985 | McClellan et al. | 118/683 |
| 4,586,459 | 5/1986 | Schultz | 118/303 |
| 4,681,457 | 7/1987 | Orimo et al. | 366/84 |
| 5,192,587 | 3/1993 | Rondy | 427/212 |
| 5,266,256 | 11/1993 | Jerman et al. | 264/211.24 |
| 5,267,788 | 12/1993 | Rockstedt | 366/85 |
| 5,308,653 | 5/1994 | Rondy | 427/212 |
| 5,354,127 | 10/1994 | Del Zotto et al. | 366/27 |
| 5,401,534 | 3/1995 | Bourreau et al. | 427/212 |

Primary Examiner—Bernard Pianalto
Attorney, Agent, or Firm—Woodard, Emhardt, Naughton Moriarty & McNett

[57] ABSTRACT

A mixing system with a vessel for supplying a liquid and a device for supplying solid pieces to mix with the liquid. The system has an elongate enclosure with a first end opposing a second end. The enclosure defines a chamber in fluid communication with the vessel to receive the liquid. The chamber also has a inlet and an outlet with the inlet being closer to the first end than the outlet. The chamber receives the pieces from the device through the inlet and issues the pieces through the outlet. A motor driven mixing auger positioned in the chamber between the first and second ends rotates a selected direction about a rotational axis to intermix the liquid and pieces. The auger includes a first helical flight between the inlet and the outlet to convey the pieces from the inlet to the outlet when the shaft is rotated the selected direction. The auger also includes a second helical flight between the first flight and the second end to urge the solid pieces in a direction opposite the first flight. The second flight has a length along the rotational axis of the auger shorter than the first flight. In one variation of this system, the liquid may be a colorant and the solid pieces may include wood chips to be intermixed with the liquid to attain a uniform visual appearance.

20 Claims, 5 Drawing Sheets

SOLID/LIQUID ROTATIONAL MIXING SYSTEM

BACKGROUND OF THE INVENTION

The present invention relates to mixing solid pieces with a liquid, and more particularly, but not exclusively, relates to coating and coloration of landscaping materials.

The problem of landfill crowding has grown steadily. One way to reduce this crowding is to recycle as many materials as possible. One type of material suitable for recycling is wood. Wood may arrive at the landfill from a natural source, such as discarded tree branches, or it may be derived from various discarded products, such as shipping crates and furniture.

One way to recycle wood is to reduce the wood to a number of pieces of generally uniform size with a shredder, chipper, or grinder. Such comminuted wood is often suitable for use as a landscaping mulch. However, the varied types of wood typically obtained from a landfill often result in a non-uniform coloration that significantly changes with age and exposure to the elements. To alleviate this problem, recycled wood pieces are sometimes treated with a colorant to provided a more pleasing appearance. U.S. Pat. No. 5,308,653 to Rondy describes one coloring process.

One problem often encountered with coloring processes is excessive run-off of liquid colorants used to impart a uniform appearance to the wood pieces. This run-off adversely impacts cost effectiveness. To address this problem, there is a need to optimize the coloration process by determining the minimum amount of liquid colorant needed for a given amount of wood. There also remains a need to provide a more cost effective way to uniformly color landscaping material.

Another problem with the coloration process is that mixers used to blend liquid colorant and wood pieces are subject to frequent jamming. Typically, the mixer becomes packed with a mass of wood chips that are stuck together. This mass of chips often prevents discharge of the treated product from the mixer. Equipment down time to unclog the mixer generally increases processing costs and may result in excessive colorant run-off. Thus, there is also a need for a mixing system which resists packing and still economically imparts a uniform color to landscaping materials.

SUMMARY OF THE INVENTION

One feature of the present invention is a system with a mixer defining a chamber that has an opening for inserting solid pieces therein. The chamber is in fluid communication with a conduit. Furthermore, the system has a source of a liquid agent and a metering device to selectively provide the agent from the source to the conduit. A water supply is coupled to the conduit to dilute the agent prior to reaching the pieces in the chamber. A controller is operatively coupled to the metering device to provide a delivery signal. The metering device responds to the delivery signal to adjust delivery of the agent to the conduit from a first non-zero rate to a second non-zero rate.

In another feature of the present invention, water and a colorant are mixed to produce a colorant liquid mixture during the movement of wood chips within a mixing chamber. Colorant supply to the liquid mixture is metered to control colorant amount or concentration in the mixture. The liquid mixture is put into the chamber to color at least a portion of the chips. The chips are discharged from the chamber. In one variation of this feature, landscaping gravel or rocks may be colored with the mixing process. In another variation, the mixture imparts a clear coating to rocks or another landscaping material to provide a high gloss appearance.

Still another feature of the present invention includes a system with blender defining a chamber with several solid pieces therein. This system has a water supply and a source of a liquid mixing component. The system also includes a static liquid mixer defining an inlet in fluid communication with the water supply and the source, and an outlet in fluid communication with the chamber. This mixer includes a cavity with at least one internal baffle for blending water and the liquid mixing component to supply a generally uniform liquid mixture to the chamber. The blender mixes the pieces and the liquid mixture to adhere a desired material to at least a portion of the pieces.

In a further feature of the present invention, a blender defines a mixing chamber with an opening for inserting solid pieces therein. The chamber is in fluid communication with a conduit. The system also includes a water supply and a flow rate regulator. The flow rate regulator includes an inlet and an outlet with the inlet being in fluid communication with the water supply and the outlet being in fluid communication with the conduit. The regulator maintains a desired flow rate of water to the conduit for varying pressures at the inlet and the outlet. The regulator is adjustable to select a desired flow rate from a range of flow rates. A source of a liquid blending component in fluid communication with the conduit is also included. The conduit supplies the chamber a mixture of water from the regulator and component from the source for intermixing with the pieces.

Yet another feature of the present invention is disposing solid pieces in a chamber defining an outlet and including an auger having a first spiral flight and a second spiral flight. The second flight turns at least 180 degrees about a rotational axis. A liquid is placed in the chamber and the auger is turned to intermix the pieces and the liquid within the chamber. Turning the auger also conveys the pieces toward the outlet with the first flight and reduces packing of the pieces at the outlet with the second flight. The pieces are discharged through the outlet. In one variation, at least a portion of the second flight is positioned over the outlet.

Among the features of the present invention is also a mixing system with a vessel for supplying a liquid and a device for supplying solid pieces to mix with the liquid. The system has an elongate enclosure with a first end opposing a second end. The enclosure defines a chamber in fluid communication with the vessel to receive the liquid. The chamber also has an inlet and an outlet with the inlet being closer to the first end than the outlet. The chamber receives the pieces from the device through the inlet and issues the pieces through the outlet. A motor driven mixing auger positioned in the chamber between the first and second ends rotates about a rotational axis to intermix the liquid and pieces. The auger includes a first helical flight between the inlet and the outlet to convey the pieces from the inlet to the outlet when the auger is rotated. The auger also includes a second helical flight between the first flight and the second end. The second flight has a length along the rotational axis shorter than the first flight. In one variation of this system, the liquid may be a colorant and the solid pieces may include wood chips to be intermixed with the liquid to attain a generally uniform color.

Accordingly, it is one object of the present invention to provide a system that controllably dispenses a liquid to a mixer for blending with solid pieces therein.

It is another object of the present invention to optimize the mixing of a concentrated liquid agent with water to create a liquid mixture for supply to the chamber of a mixer for blending with solid pieces. The agent may include a colorant or clear coat material and the solid pieces may comprise landscaping material such as wood chips or rocks.

An additional object of the present invention is to provide a mixer which resists packing of solid pieces being blended with a liquid therein.

Further objects, features, aspects, and advantages of the present invention shall be apparent from the detailed drawings and descriptions provided herein.

DESCRIPTION OF THE PREFERRED EMBODIMENT

Figure 1:
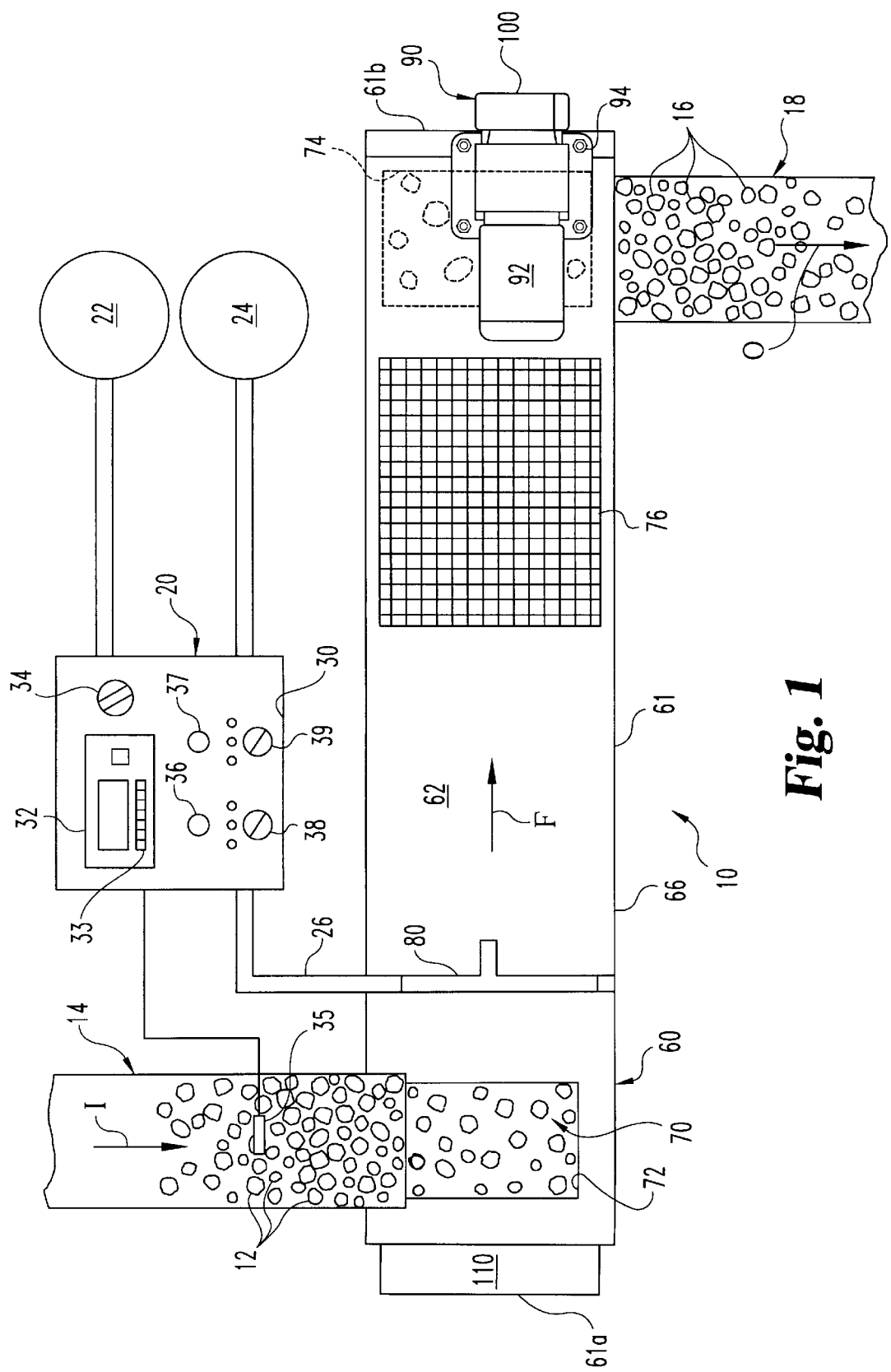
FIG. 1 is a schematic top view of a colorant mixing system of one preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 depicts a colorant mixing system 10 of the present invention. In system 10, a number of wood chips 12 are transported by conveyer 14 in a direction along arrow I to mixer 60. The chips 12 enter chamber 70 of mixer 60 through inlet 72 and are processed therein. This processing includes mixing with a water-based colorant from dispensing system 20. Processed wood chips 16 exit through outlet 74 of mixer 60 and are carried away by conveyer 18 in a direction along arrow O.

Dispensing system 20 combines concentrated colorant from source 22 with water from water supply 24 to provide a liquid mixture for delivery to chamber 70 via conduit 26. Preferably, source 22 includes a vessel holding an ample supply of the concentrated colorant. Source 22 may include a plurality of vessels or a colorant dispensing sub-system. Water supply 24 is preferably a well water source or city water source of a conventional type.

Dispensing system 20 includes control panel 30 with a display 32 indicating the rate colorant is being delivered for mixing. This rate may be continuously adjusted by an operator with rotary control 34. Control panel 30 also includes a control key pad 33, a master start switch 36, and a master stop switch 37. Switches 36, 37 start and stop delivery system 20, respectively. In addition, control panel 30 has switch 38 corresponding to water supply 24 and switch 39 corresponding to colorant source 22. Each switch 38, 39 has three positions: on, off, and automatic (or "auto").

When each switch 38, 39 is in the auto position, delivery system 20 operates normally. The on/off positions are used to separately start and stop water or colorant, respectively, for calibration purposes.

Delivery system 20 is also operatively coupled to sensor 35. Sensor 35 provides a stop signal corresponding to the absence of material on conveyer 14. This stop signal is then used to halt delivery system 20. Sensor 35 may be a microswitch with an actuation arm positioned above conveyer 14 a selected distance. This arm is configured to either open or close the microswitch when material on conveyor 14 of a selected height no longer contacts it. Opening or closing of this microswitch sends the corresponding stop signal. Other types of sensors as would occur to one skilled in the art are also contemplated.

Figure 2:
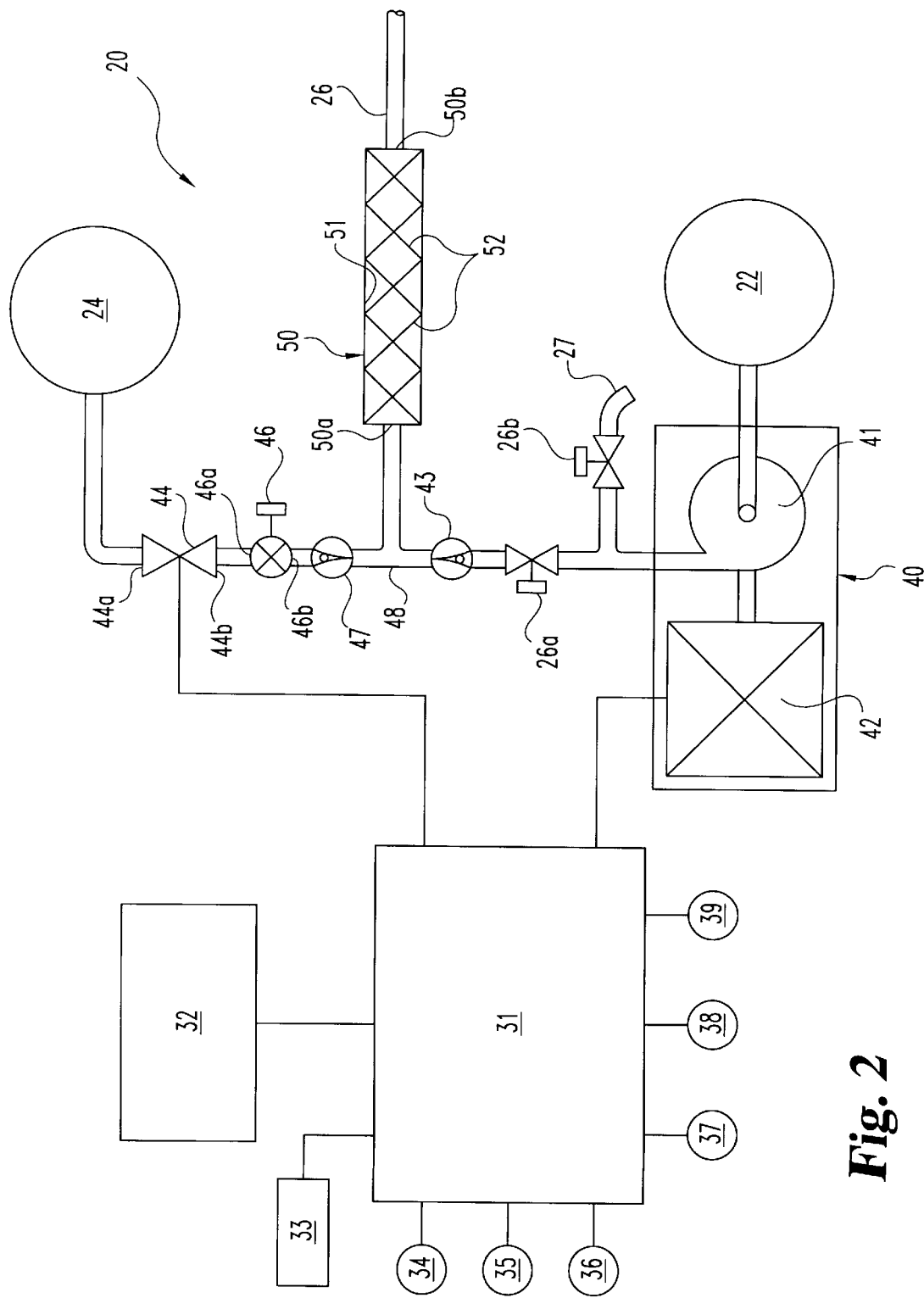
FIG. 2 is a diagrammatic view of the colorant dispensing system of the embodiment of FIG. 1.

Referring additionally to FIG. 2, further details of delivery system 20 are described. Controller 31 is operatively coupled to display 32, key pad 33, rotary control 34, sensor 35 and switches 36, 37, 38, and 39 to coordinate and supervise operation of delivery system 20. Controller 31 may be an electronic circuit comprised of one or more components. Similarly, controller 31 may be comprised of digital circuitry, analog circuitry, or both. Also, controller 31 may be programmable, an integrated state machine, or a hybrid combination thereof. However, preferably controller 31 is microprocessor based with a known construction and has a control program loaded in non-volatile memory. In one embodiment a microcontroller/keyboard combination is supplied as Durant Model No. 5881-5 with part no. 5881-5-400 by Eaton Corporation of Waterloo, Wis., 53094.

Controller 31 is also coupled to pump system 40. Pump system 40 includes positive cavity control pump 41 coupled to source 22 and driven by motor 42. Controller 31 provides a delivery signal to motor 41 corresponding to a selected rate of delivery of concentrated colorant input to controller 31 with rotary control 34. In one embodiment, controller 31 responds to a stop signal from sensor 35 to generate a delivery signal which shuts down pump system 40. This delivery signal may alternatively be characterized as a "shut down" signal.

The colorant output by pump 41 encounters valves, 26a, 26b. Under usual operating conditions, valve 26a is open and valve 26b is closed so that colorant flows through check valve 43. Check valve 43 generally maintains "one way" flow of colorant away from pump 41. Colorant from check valve 43 empties into joining conduit 48. During calibration of pump system 40, valve 26a is closed, and valve 26b is open so that colorant flows through calibration outlet 27 for collection and possible reuse. Besides pump system 40, other metering devices as would occur to one skilled in the art are also contemplated.

Controller 31 is also operatively coupled to on/off valve 44 having inlet 44a in fluid communication with water supply 24, and outlet 44b for supplying water therefrom. Valve 44 is responsive to a signal from controller 31 to correspondingly start or stop water flow from supply 24. In one embodiment, controller 31 responds to a stop signal from sensor 35 to shut down water supply 24 by closing valve 44 via a shut down signal. Valve 44 may be a conventional solenoid activated stop valve.

Outlet 44b of valve 44 is in fluid communication with inlet 46a of flow regulator 46. Flow regulator 46 has outlet 46b in fluid communication with check valve 47. Check valve 47 maintains water flow away from flow regulator 46 to joining conduit 48. Flow regulator 46 maintains a generally constant flow rate of water despite varying pressures at inlet 46a and/or outlet 46b. Accordingly, flow regulator 46 adjusts to maintain a generally constant pressure differential between inlet 46a and outlet 46b. Flow regulator 46 has an adjustable orifice to correspondingly select the regulated rate of flow from a given range of flow rates. In one embodiment, model no. JB11T-BDM from W. A. Kates, Co., 1450 Jarvis Avenue, Ferndale, Mich. 48220 is used for flow regulator 46 to provide a desired water flow rate selected from between 3 and 80 gallons per minute. In other embodiments, a different flow regulator may be used or a flow regulator may not be used at all.

Although water and concentrated colorant may begin mixing in joining conduit 48, static in-line liquid mixer 50 provides a substantially homogenous liquid mixture of concentrated colorant diluted by water which is not generally provided by a conduit of generally constant internal cross-section. Concentrated colorant and water enter static liquid mixer 50 through inlet 50a and exit through outlet 50b. Static liquid mixer 50 is preferably made from a transparent PVC material so that blending cavity 51 therein may be observed. Within blending cavity 51 are a number of interconnected internal baffles 52. Baffles 52 are arranged to split the stream of liquid entering through inlet 50a and force it to opposite outside walls of mixer 50. A vortex is created axial to the center line of mixer 50 by the arrangement of baffles 52. The vortex is sheared and the process re-occurs but with opposite rotation several times along the length of static liquid mixer 50. This clockwise/counterclockwise motion mixes the liquid to provide a substantially homogenous mixture through outlet 50b and into conduit 26. Notably, static liquid mixer 50 operates without moving internal parts other than the liquid being mixed. This homogenous premixed liquid enhances uniform coloring of wood chips. Cole-Parmer Instrument Company of Niles, Ill. 60714 provides a PVC static liquid mixer model no. H-04669-59 which is preferred for one embodiment of the present invention.

In other embodiments, a static mixing cavity arranged to promote mixing without internal baffles may be used. U.S. Pat. No. 4,516,524 to McClellan et al. is cited as a source of additional information concerning a dedicated static mixing cavity of this type. In still other embodiments, premixing of colorant and water prior to entry into chamber 70 is not necessary.

By controlling the rate of delivery of colorant with control 34 to static liquid mixer 50 and maintaining a generally constant flow rate of water with flow regulator 46, a desired concentration of water based colorant mixture may be selected. This concentration, and the rate of flow of the mixture to chamber 70 of mixer 60 may be matched to the rate of transport of wood chips therethrough to optimize colorant system 10 performance. As a result, the minimum amount of water necessary to provide uniform coloration for the wood chips may be determined by taking into account the absorbency of the liquid by the wood chips 12, the rate of flow of the liquid into chamber 70, and the rate of passage of wood chips 12 through mixer 60. Notably, the rate of liquid flow can be adjusted with flow regulator 46 and with rotary control 34, and the ratio of water to colorant can likewise be adjusted to assure a concentration which will provide uniform coloration. By optimizing these amounts, the amount of liquid runoff can be minimized and this optimal performance can be reliably reproduced. Also, an adjustable flow rate and colorant delivery rate permits re-optimization of the process when various parameters change; including, but not limited to, a different colorant type, different wood chip delivery rate, or different type of wood chips.

Besides optimizing colorant mixture delivery to mixer 60, in other embodiments controller 31 may also be used for a variety of record keeping functions, such as maintaining a record of the amount of colorant dispensed over a given period of time. The amount dispensed may be displayed or otherwise accessed by an operator using keypad 33. Controller 31 may be configured to provide an operator preferred parameters for flow regulator 46 and metering of colorant with pump system 40 via display 32 and keypad 33. Also, it may be configured to assist the operator with adjustments relating to different wood chip types, sizes, or delivery rates. In this embodiment, the speed of conveyer 14 may also be sensed with controller 31 to ascertain optimum liquid mixture parameters of delivery system 20. Also, controller 31 may control speed of conveyer 14 or 18, or otherwise be coupled to mixer 60 to control various operational aspects thereof. In one alternative embodiment, control panel 30, controller 31, display 32, control 34, and switches 36, 37, 38, 39 are embodied in a ruggedized personal computer customized with appropriate hardware and software to controllably interface with the other components of delivery system 20 and including a conventional video display and keyboard.

In an alternative embodiment, operator control via controller 31 is provided over the rate of water flow to the mixture instead of colorant. In this embodiment, colorant concentration is regulated by adjusting the amount of water with controller 31, and the colorant flow is kept generally constant. In other embodiments, both water supply 24 and source 22 are operatively coupled to controller 31 to provide dynamic adjustment over the relative flow rate and amount of from each. In still other embodiments, more than two sources of liquid components may be operatively coupled to controller 31 to provide a desired liquid mixture.

Delivery system 30 may also be used to control delivery of various other mixtures of liquid agents or mixing components. Also, besides wood chips, other solid pieces may be treated with a given liquid mixture from delivery system 20 in mixer 60. For example, a high gloss transparent coating on certain types of landscaping rocks or gravel may also be provided with system 10. Preferably, this clear coat is provided by a mixture of water and an organic-based polymer component. Similarly, other solid pieces and liquid mixtures containing various components may be used with system 10 as would occur to one skilled in the art.

Referring next to FIG. 1 and FIGS. 3–5, additional details concerning mixer 60 are next described. Mixer 60 includes enclosure 61 defining chamber 70. Enclosure 61 is elongated and has end 61a opposing end 61b along its length. Enclosure 61 has top 62 opposing base 64. Opposing sides 66 and 68 join top 62 and base 64. Top 62 defines inlet 72 and grated observation window 76. Preferably, top 62 is provided by panels which may be removed to gain access to chamber 70 for maintenance purposes. Base 64 defines discharge outlet 74.

Figure 3:
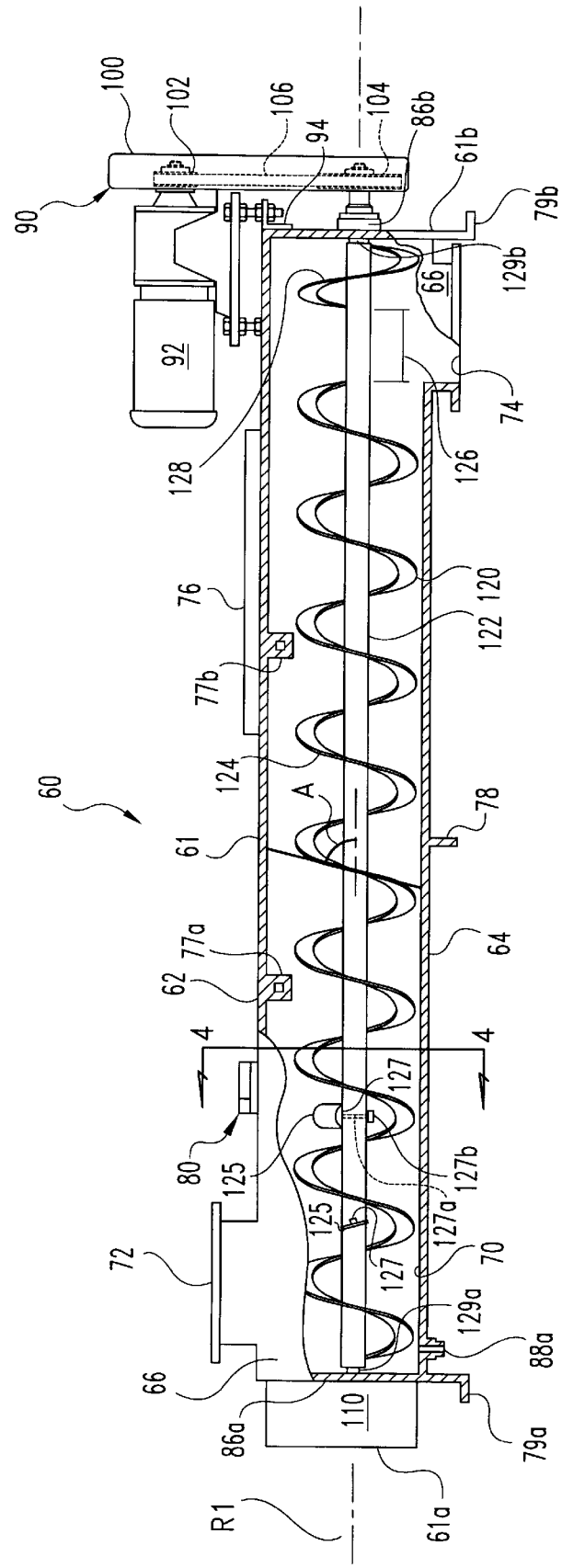
FIG. 3 is a partial cut-away side view of the mixer of the embodiment of FIG. 1.

In FIG. 3 specifically, internal transverse support members 77a, 77b are shown in cross-section. Members 77a, 77b include a square cross-section and are preferably manufactured from carbon steel. Also, support flange 78 is illustrated between ends 61a and 61b of enclosure 61. Adjacent end 61a, 62b is a right angle bearing flange 79a, 79b which supports mixer 60.

Figure 4:
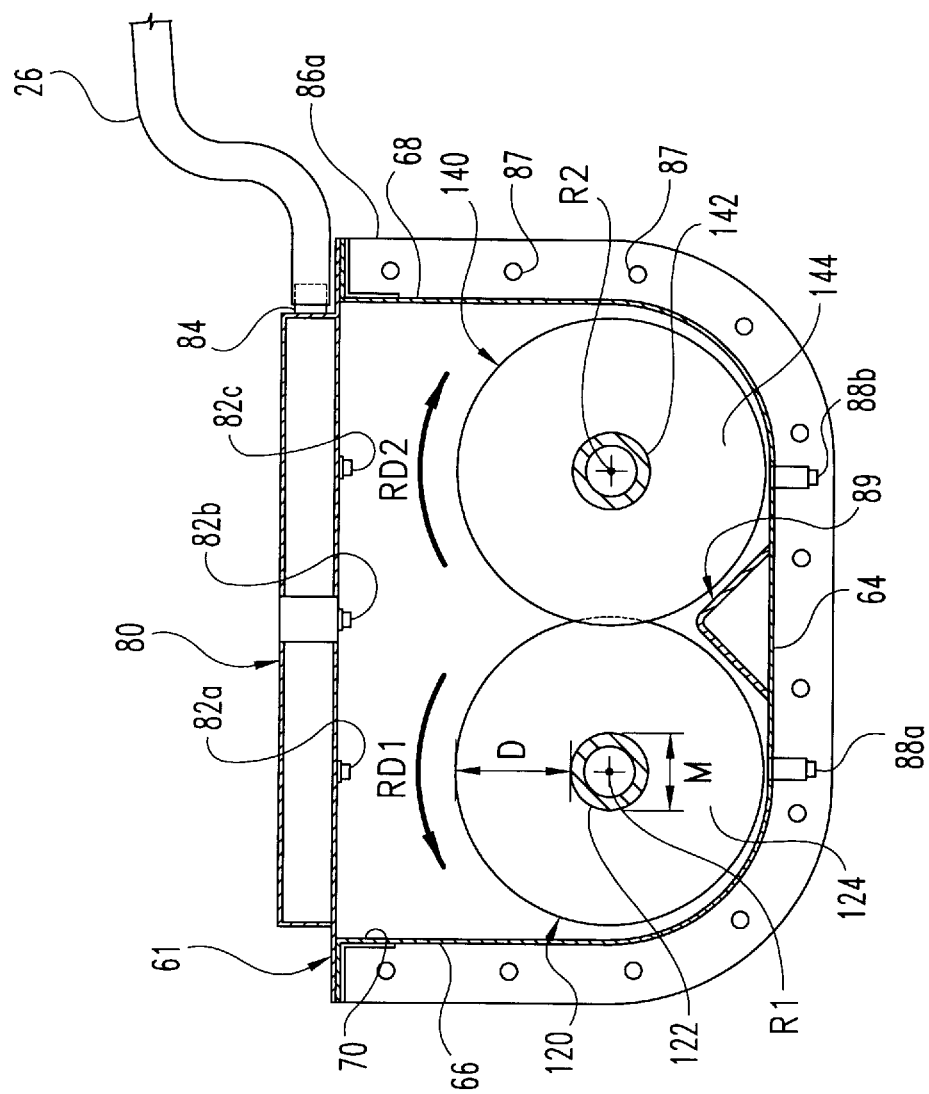
FIG. 4 is a side cross-sectional view of the mixer shown in FIG. 3.

FIGS. 1, 3 and 4 illustrate a spray manifold 80. Spray manifold 80 is in fluid communication with spray nozzles 82a, 82b, 82c (collectively designated nozzles 82). In other embodiments, more or less nozzles may be used. Nozzles 82 are in fluid communication with chamber 70. Manifold 80 has intake 84 configured to receive liquid through conduit 26 for distribution within manifold 80 to nozzles 82. Excess liquid within chamber 70 may be drained through drain plugs 88a, 88b, as particularly illustrated in FIGS. 3 and 4.

Referring specifically to FIG. 4, a cross-section of chamber 70 is shown. Also, protruding end flange 86a is illustrated with a number of attachment sights 87 along its periphery. End flange 86a is joined to bearing flange 79a using conventional methods. A similar structure at end 61b is formed with end flange 86b and bearing flange 79b. At the bottom of chamber 70 is a triangular partition 89. Preferably, enclosure 61 and manifold 80 are manufactured from a metallic material, such as carbon steel; however, other materials as occur to one skilled in the art are also contemplated.

Figure 5:
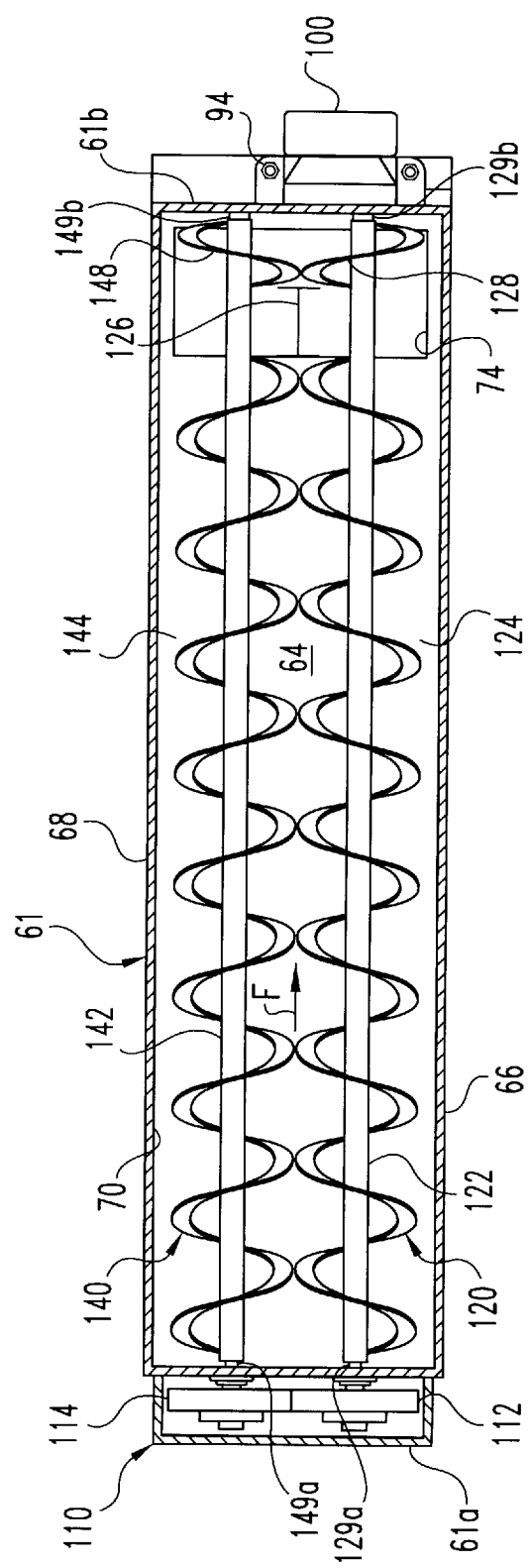
FIG. 5 is a top cross-sectional view of the mixer shown in FIG. 3.

FIGS. 1, 3, and 5 depict various features of drive mechanism 90. Drive mechanism 90 includes motor 92 mounted to enclosure 61 by support 94. Also drive mechanism 90 includes drive box 100 and gear box 110. Preferably, motor 92 is electrically powered, but other types of motors may also be employed, such as a gasoline-fueled internal combustion engine. A shaft from motor 92 extends into drive box 100 and is connected to sprocket 102 therein. Sprocket 102 is operatively coupled to sprocket 104 by drive chain 106.

Sprocket 104 is attached to auger 120 by coupling shaft 129b at the end of auger 120 closest to end 61b of enclosure 61. An opposing end of auger 120 is attached to coupling shaft 129a which extends into gear box 110. Within gear box 110, gear wheel 112 is coupled to coupling shaft 129a and intermeshes with gear wheel 114 coupled to coupling shaft 149a. Shaft 149a is coupled to auger 140 at the end of auger 140 closest to end 61a of enclosure 61. At the opposing end of auger 140, coupling shaft 149b is coupled thereto. Coupling shafts 129a, 149a are rigidly attached to shafts 122, 142, respectively, and are journaled to enclosure 61 at end 61a by appropriate bearings. Coupling shafts 129b, 149b are rigidly attached to shafts 122, 142 and are journaled to enclosure 61 at end 61b by appropriate bearings.

Referring specifically to FIGS. 3–5, auger 120, 140 are further described. Auger 120 includes a shaft 122 generally oriented along the length of enclosure 61. Attached to auger 120 is helical or spiral flight 124. Flight 124 is configured to turn about shaft 122 in a counterclockwise direction as it advances from end 61a toward end 61b. Preferably, flight 124 makes at least three revolutions about shaft 122. More preferably, flight 124 makes at least five revolutions about shaft 122. Most preferably, flight 124 makes at least nine revolutions about shaft 122.

Preferably, the pitch angle of flight 124 is at least 45°. More preferably, the pitch angle of flight 124 is in the range of 65° to 80°. Most preferably, the pitch angle of flight 124 is about 75°. As used herein, "pitch angle" means the angle formed between a tangent to an edge of the helical flight and the rotational axis of the flight. FIG. 3 illustrates a pitch angle of flight 124 as angle A. In one embodiment, the pitch angle of flight 124 varies, with a portion closest to end 61a having a different pitch angle than the rest of flight 124. In other embodiments, the pitch angle varies in a different fashion or is generally constant.

Referring specifically to FIG. 3, auger 120 includes mixing paddles 125 interposed along flight 124. Each mixing paddle 125 is attached to shaft 122 by fastener 127. Each fastener 127 has bolt 127a extending through shaft 122 and secured thereto by nut 127b. By loosening nut 127b, the pitch of mixing paddle 125 relative to flight 124 may be adjusted. Nut 127b is then re-tightened to secure the newly selected paddle pitch. Preferably, mixing paddles 125 do not extend as far from shaft 122 as flight 124. It is also preferred that auger 140 include mixing paddles distributed along shaft 142 which are interposed with flight 144 (not shown).

In one embodiment, about twelve mixing paddles 125 are distributed along shaft 122, being spaced along the segment of axis R1 corresponding to flight 124 at approximately equal intervals. From one to the next, mixing paddles 125 of this embodiment are positioned about axis R1 approximately 75 degrees apart. In addition, each mixing paddle has a portion extending from shaft 122 that has a generally planar sector shape. This sector shape sweeps about a 40 degree angle between radii entending from axis R1. Preferably, auger 140 is similarly configured for this embodiment.

Referring again to FIGS. 3–5, auger 120 also has a reverse spiral flight 128 spaced apart from flight 124 by gap 126 along shaft 122. Preferably, flight 128 turns around axis R1 at least 180 degrees. More preferably, flight 128 turns about axis R1 at least 330 degrees. Most preferably, flight 128 turns about axis R1 approximately 360 degrees or makes about one revolution around shaft 122 (including axis R1) between flight 124 and end 61b. Flight 128 advances in a direction from end 61a to 61b with a clockwise spiral rotation. Thus, the rotational direction of flight 128 is opposite the rotational direction of flight 124.

Generally, shaft 122 along gap 126 is flightless. The length of gap 126 along shaft 122 is preferably about the length of flight 124 along shaft 122 corresponding to one revolution about shaft 122. Gap 126 and flight 128 both partially overlap or overhang outlet 74 so that at least a portion of flight 128 is positioned over outlet 74.

Auger 140 is configured similar to auger 128 except the rotational orientation of the flighting is reversed. Specifically, helical flight 144 of auger 140 turns about shaft 142 in a clockwise direction as it advances from end 61a to end 61b. Flight 148 turns about shaft 142 in a counterclockwise direction as it advances in a direction from end 61a toward end 61b. Augers 120 and 140 preferably intermesh a slight amount as most clearly depicted in FIG. 4. This intermeshing is accomplished by slightly offsetting the maximum extension point of the flights relative to each other.

FIG. 4 illustrates additional characteristics of flight 124, 144. Shaft 122 has a maximum cross-sectional dimension (M) perpendicular to the plane of view of FIG. 4, and flight 124 has a distance D extending from shaft 122 along this plane. Preferably, the extension ratio (ER), of D to M is greater than 1; where ER=D÷M. More preferably, ER is at least 1.5, and most preferably ER is at least 2.0. The quantity M is determined as the maximum cross-sectional dimension of the shaft for its given shape along a cross-sectional plane perpendicular to its rotational axis. Similarly, D is determined as the distance the flight extends from the shaft along an axis perpendicular to the rotational axis of the shaft. Preferably, shafts 122, 144 each have a generally right cylindrical shape, presenting an approximate circular cross-section perpendicular to rotational axes R1, R2; and flights 124, 128, 144, 148 present a generally circular cross-section along a plane perpendicular to the rotational axes R1, R2 of the shafts 122, 142, respectively.

Generally referring to FIGS. 1–5, selected operational features of mixer 60 are next discussed. Chips 12 enter inlet 72 of enclosure 61 via conveyer 14. When activated, motor 92 turns sprocket 102 which rotates sprocket 104 via chain 106. Rotation of sprocket 104 turns auger 120 about rotational axis R1 in the direction RD1, driving auger 120 in a counterclockwise or "left hand" direction. Rotational axes R1, R2 are shown in FIG. 4 as cross-hair points generally concentric with the cross-section of shafts 122, 142, respectively. Notably, these axes are generally parallel to each other and are parallel to the longitudinal axis of augers 120, 140, and enclosure 61.

The rotation of auger 120 turns gear wheel 112 contained in gear box 110. Gear wheel 112 rotates gear wheel 114 in response in the opposite direction. Correspondingly, auger 140 rotates along with gear wheel 114 in a clockwise or "right hand" direction indicated by arrow RD2.

Rotation of flights 124, 144 of auger 120, 140 about axes R1, R2 provides an "archimedes screw" type of conveyer which transports wood chips 12 entering inlet 72 along the direction indicated by arrow F, from end 61a toward end 61b. At the same time that flights 124, 144 move material along arrow F, flights 124, 144 also tumble and intermix the solid pieces with a liquid colorant mixture sprayed into chamber 70 via nozzles 82. The liquid mixture is supplied by dispensing system 20 to manifold 80. The mixing of the liquid and solid pieces continues as it travels past manifold 80 and by window 76 along arrow F. Mixing paddles 125 assist intermixing by agitating the mixture of solid pieces and liquid. Preferably, mixing paddles 125 are pitched to oppose the flow of material along arrow F; and thereby enhance mixing. By adjusting the pitch of mixing paddles 125 relative to flight 124, the average dwell time in chamber 70 of a given material may be changed. This feature further assists in controlling absorption of the liquid mixture by the wood chips to minimize run-off.

As gap 126 is encountered by material moving through chamber 70, processed wood chips 16 begin to exit through outlet 74 to be carried away by conveyer 18 in a direction indicated by arrow O.

Unfortunately, the wet mass of material at gap 126 has a tendency to stick together—despite gravity urging it to fall through outlet 74. As a result, material may occasionally bridge gap 126 and encounter either or both of flights 128 and 148. Because flights 128, 148 oppose the rotational orientation of flights 124, 144, respectively; flights 128, 148 both tend to move material opposite the direction of arrow F—that is in a direction away from end 61b. The opposing configurations of flights 124, 144 with respect to flights 128, 148 tend to break up a mass of material bridging gap 126 to thereby facilitate discharge through outlet 74. Consequently, the auger configuration of mixer 60 tends to reduce the incidence of material packing in outlet 74 and so reduces the number of mixing interruptions due to jamming or clogging.

Mixer 60 may be used with a variety of liquid mixture types for coating or adhering a desired substance to wood chips. Likewise, various solid pieces other than wood chips may be processed in this manner. Preferably, mixer 60 is used so that the direction of the flow along arrow F is generally horizontal. However, in other embodiments, mixer 60 may be inclined in varying amounts as would occur to one skilled in the art.

All publications and patent applications cited in this specification are herein incorporated by reference as if each individual publication or patent application were specifically and individually indicated to be incorporated by reference.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of mixing, comprising:
   (a) disposing a number of solid pieces in a chamber defining an outlet, the chamber including an auger with a first spiral flight and a second spiral flight, at least a portion of said second flight being positioned over the outlet and having a rotational orientation opposite the first flight;
   (b) placing a liquid in the chamber; and
   (c) turning the auger with a motor to intermix the solid pieces and the liquid within the chamber, convey the solid pieces toward the outlet with the first flight, and reduce packing of the solid pieces at the outlet with the second flight;
   (d) discharging the solid pieces through the outlet.

2. The method of claim 1, wherein at least 90 cubic yards of the pieces are processed per hour.

3. The method of claim 1, wherein at least 200 cubic yards of the pieces are processed per hour.

4. The method of claim 1, wherein the chamber includes an inlet and further comprising conveying the pieces to the inlet.

5. The method of claim 1, wherein the first flight has a rotational orientation about a rotational axis opposite the second flight.

6. The method of claim 1, further comprising conveying the pieces away from the outlet after said discharging.

7. The method of claim 1, wherein the auger is one of a pair of augers in the chamber.

8. A method of mixing, comprising:
   (a) disposing a number of wood pieces in a chamber defining an outlet, the chamber including an auger with a first spiral flight and a second spiral flight configured to rotate about an axis, the second flight turning about the axis at least 180 degrees with a rotational orientation opposite the first flight;
   (b) placing a liquid colorant in the chamber;
   (c) rotating the auger about the axis to color the wood pieces with the colorant in the chamber; and
   (d) discharging the wood pieces through the outlet.

9. The method of claim 8, wherein at least 90 cubic yards of the wood pieces are colored per hour.

10. The method of claim 8, wherein at least 150 cubic yards of the wood pieces are processed per hour.

11. The method of claim 8, wherein at least 200 cubic yards of the wood pieces are processed per hour.

12. The method of claim 8, wherein the chamber includes an inlet and further comprising:
   (e) conveying the wood pieces to the inlet; and
   (f) conveying the wood pieces away from the outlet after said discharging.

13. The method of claim 8, wherein the auger includes a number of mixing paddles and further comprising adjusting dwell time of the pieces in the chamber by changing pitch of the mixing paddles.

14. The method of claim 8, wherein the second flight turns about the axis at least 330 degrees.

15. The method of claim 8, wherein the first flight makes at least three revolutions about the shaft and the second flight makes at least one revolution about the shaft.

16. The method of claim 8, further comprising mixing water and a concentrated liquid colorant during said rotating.

17. The method of claim 1, wherein the auger includes a shaft, the first flight and the second flight being mounted to the shaft, and the auger defining a gap between the first flight and the second flight along the gap.

18. The method of claim 17, wherein the auger includes a number of mixing paddles extending from the shaft and further comprising adjusting pitch of the mixing paddles to control dwell time of the pieces in the chamber.

19. The method of claim 8, wherein said rotating is performed with an electric motor.

20. The method of claim wherein the auger is one of a pair of augers in the chamber, the pair of augers each having a first helical flight segment and a second helical flight segment, the first helical flight segment having a rotational orientation opposite the second helical flight section.

* * * * *